(12) United States Patent
McCarthy et al.

(10) Patent No.: US 7,722,110 B2
(45) Date of Patent: May 25, 2010

(54) WHEEL-LESS PICK-UP TRUCK CAMPER WITH INTERNAL JACKS

(75) Inventors: Robert E. McCarthy, Crete, IL (US); John L. Verre, Orland Park, IL (US); Douglas A. Bakker, Cedar Lake, IN (US)

(73) Assignee: Rieco Titan Products, Inc., Frankfort, IL (US)

( * ) Notice: Subject to any disclaimer, the term of this patent is extended or adjusted under 35 U.S.C. 154(b) by 0 days.

(21) Appl. No.: 11/655,562

(22) Filed: Jan. 19, 2007

(65) Prior Publication Data
US 2008/0174146 A1    Jul. 24, 2008

(51) Int. Cl.
B60O 1/00    (2006.01)
(52) U.S. Cl. ...................................... 296/156
(58) Field of Classification Search ................ 296/156, 296/165, 168, 26.05, 164; 414/462, 495, 414/498, 500, 538
See application file for complete search history.

(56) References Cited

U.S. PATENT DOCUMENTS

| | | | | |
|---|---|---|---|---|
| 3,197,054 A * | 7/1965 | Settem | ........................ | 414/500 |
| 3,368,839 A * | 2/1968 | Stewart | ........................ | 296/165 |
| 3,436,774 A * | 4/1969 | Schmitz | ........................ | 114/344 |
| 3,507,476 A * | 4/1970 | Bennett | ........................ | 254/45 |
| 3,523,698 A * | 8/1970 | Bishop | ................... | 280/766.1 |
| 3,640,502 A * | 2/1972 | Bargman, Jr. | ................. | 254/45 |
| 3,679,174 A * | 7/1972 | Boettcher | ..................... | 254/45 |
| 3,709,467 A * | 1/1973 | Mann | ........................... | 254/45 |
| 3,758,074 A * | 9/1973 | Jeffries et al. | .................. | 254/45 |
| 3,828,379 A * | 8/1974 | Walston | ........................ | 114/344 |
| 3,909,057 A * | 9/1975 | Guthry | ........................ | 296/157 |
| 3,984,082 A | 10/1976 | Boettcher | | |
| 4,176,825 A | 12/1979 | Schwebke | | |
| 4,238,113 A * | 12/1980 | Adams | ........................ | 254/425 |
| 4,247,145 A * | 1/1981 | Groene | ........................ | 296/164 |
| 4,254,927 A * | 3/1981 | Stonhaus | ................. | 248/346.5 |
| 4,685,695 A | 8/1987 | LeVee | | |
| 4,754,998 A * | 7/1988 | LeJuerrne | .................... | 296/157 |
| 4,784,369 A * | 11/1988 | Bock | ............................ | 254/45 |
| 5,188,379 A * | 2/1993 | Krause et al. | ............... | 254/423 |
| 5,219,429 A * | 6/1993 | Shelton | ........................ | 254/423 |
| 5,273,256 A * | 12/1993 | Chambers | ..................... | 254/45 |
| 5,312,119 A * | 5/1994 | Schneider et al. | ......... | 280/766.1 |

(Continued)

Primary Examiner—Kiran B. Patel
(74) Attorney, Agent, or Firm—Leydig, Voit & Mayer, Ltd.

(57) ABSTRACT

The wheel-less camper comprises at least one jack mounted to the camper, the first jack being disposed inside the first sidewall. The camper may include a second jack, the second jack being disposed inside the second sidewall. Each wall of the camper may have an inner wall and an outer wall, the first jack being disposed between the inner and outer wall of the first sidewall and the second jack being disposed between the inner wall and outer wall of the second sidewall. The camper may also include third jack and a fourth jack. In one embodiment, the inner walls are omitted. In another embodiment, the inner wall includes a bulged area or an unevenness to accommodate one or more of the jacks. In another embodiment, the first jack may be a pull-out jack that is movable between a first position in which it is disposed inside the first sidewall and a second position in which it extends out from the first sidewall. The camper may include a second pull-out jack.

16 Claims, 14 Drawing Sheets

U.S. PATENT DOCUMENTS

| | | | |
|---|---|---|---|
| D348,966 S * | 7/1994 | Guyton | D34/31 |
| 5,348,258 A * | 9/1994 | Rasmussen | 248/218.4 |
| 5,575,493 A * | 11/1996 | Schwartz et al. | 280/475 |
| 5,711,561 A * | 1/1998 | Boysen | 293/116 |
| 5,755,430 A * | 5/1998 | Couch | 254/420 |
| 5,848,870 A * | 12/1998 | Smith et al. | 296/26.05 |
| 5,934,738 A * | 8/1999 | Welles | 296/165 |
| 5,984,353 A * | 11/1999 | Rasmussen | 280/766.1 |
| 6,102,468 A * | 8/2000 | Lowrey et al. | 296/169 |
| 6,135,525 A * | 10/2000 | Amann | 296/26.11 |
| 6,142,501 A | 11/2000 | Fogo et al. | |
| 6,170,502 B1 * | 1/2001 | Pullen | 296/156 |
| 6,250,650 B1 | 6/2001 | Douglas | |
| 6,283,536 B1 * | 9/2001 | Muzyka et al. | 296/165 |
| 6,517,026 B1 * | 2/2003 | Smith | 244/2 |
| 6,679,542 B1 * | 1/2004 | Semotuk | 296/165 |
| 6,698,810 B1 * | 3/2004 | Lane | 296/26.05 |
| 6,712,414 B2 * | 3/2004 | Morrow | 296/165 |
| 6,789,361 B1 * | 9/2004 | Spartz et al. | 52/79.9 |
| 7,014,238 B2 * | 3/2006 | Gonzalez | 296/26.05 |
| 7,044,445 B1 * | 5/2006 | Crawford | 254/425 |
| 7,198,314 B1 * | 4/2007 | Edwards | 296/26.04 |
| 7,287,798 B2 * | 10/2007 | King | 296/26.11 |
| 2006/0284146 A1 * | 12/2006 | Perham | 254/45 |

* cited by examiner

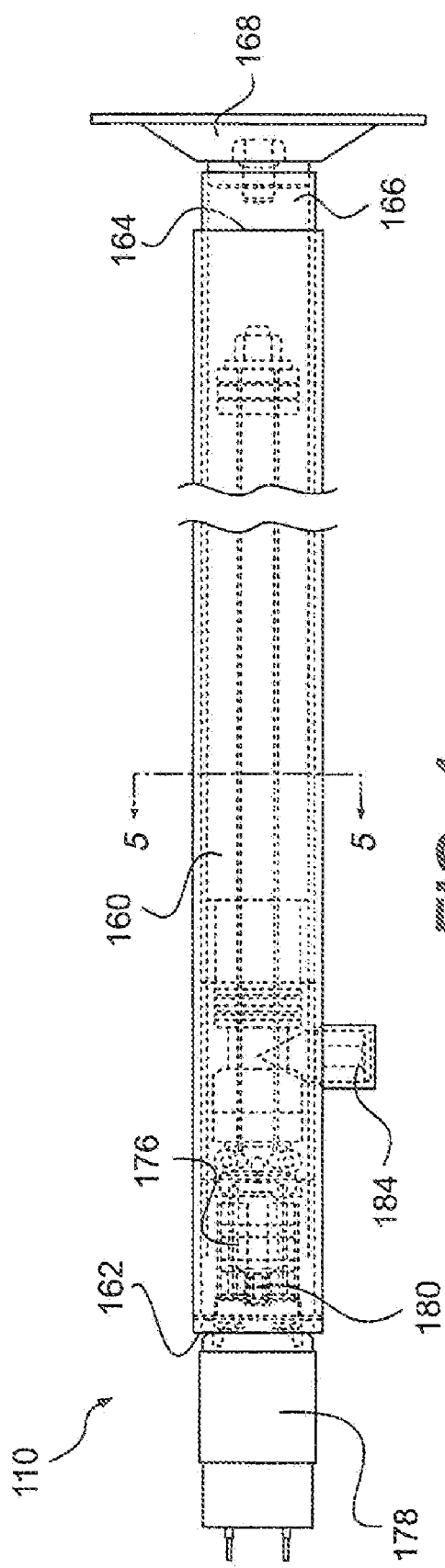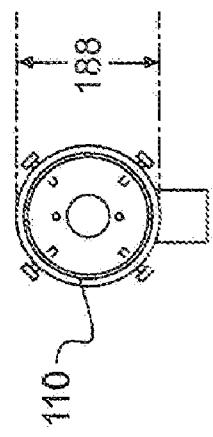

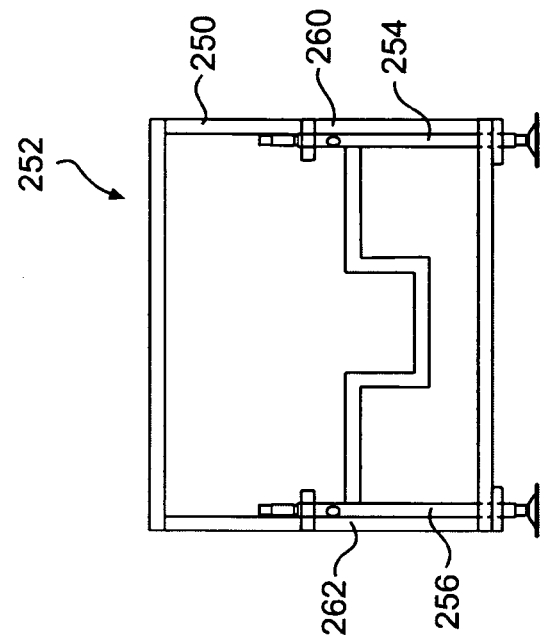
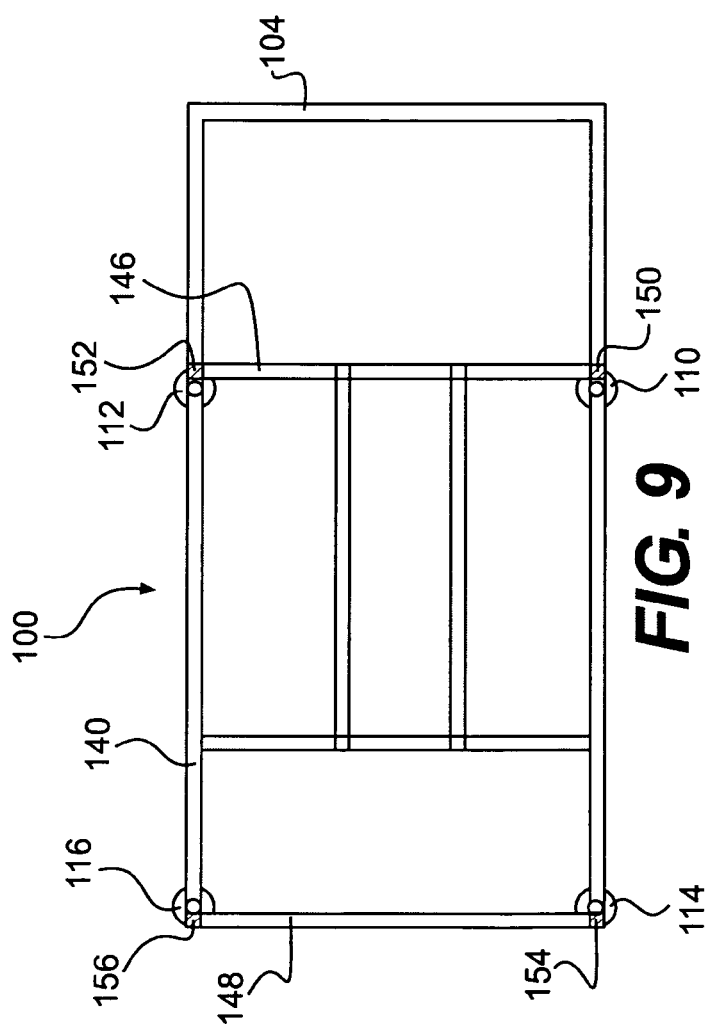

WHEEL-LESS PICK-UP TRUCK CAMPER WITH INTERNAL JACKS

FIELD OF THE INVENTION

The present invention relates generally to a truck camper, and more particularly to a pick-up truck or slide-in camper with an internal jack system.

BACKGROUND OF THE INVENTION

Pick-up campers with jacks have been used for many years. Pick-up truck campers have no wheels and must be lifted on and off a truck for transport to a campsite. Typical pick-up truck campers that rely on jacks to raise and lower the camper have included external jacks mounted to the outside of the camper. The external jacks project from the outside walls of the camper. Such an arrangement can be unsightly. Additionally, because the external jacks are mounted outside of the camper, they are more susceptible to damage from impact with other objects during normal use of the camper. The external jacks are also susceptible to damage from the elements such as, for example rusting. External jacks have been attached to the campers by a variety of attachment means. The external jacks can also be removable and may only be attached to the campers when needed. This arrangement presents an inconvenience to the user of the camper as attaching and removing the external jacks is time consuming and laborious.

BRIEF SUMMARY OF THE INVENTION

The present invention provides a wheel-less pick-up truck camper including a frame. The camper further comprises a first sidewall, a second sidewall, a front wall, and a rear wall covering the frame. The walls can define the exterior of the camper. The camper comprises at least one jack mounted to the camper, the first jack being disposed inside the first sidewall. The camper may include a second jack, the second jack being disposed inside the second sidewall. The camper may also include a third jack and a fourth jack.

Each wall of the camper may have an inner wall and an outer wall, the first jack being disposed between the inner and the outer wall of the first sidewall and the second jack being disposed between the inner wall and the outer wall of the second sidewall. However, an inner wall need not be part of the camper wall construction such that the jacks are completely or partially exposed to be visible from the interior of the camper. In other embodiments where an inner wall is provided, the inner wall may have a bulged area or unevenness to accommodate one or more of the jacks.

In another embodiment of the present invention, a wheel-less pick-up truck camper includes a frame. The camper further comprises a first sidewall, a second sidewall, a front wall, and a rear wall covering the frame. The walls define the exterior of the camper. The camper comprises at least one jack mounted to the camper, the first jack being a pull-out jack that is movable between a first position in which it is disposed inside the first sidewall and a second position in which it extends out from the first sidewall. The camper may include a second jack, the second jack being a pull-out jack that is movable between a first position in which it is disposed inside the second sidewall and a second position in which it extends out from the second sidewall. The camper may also include a third jack and a fourth jack. The first jack and the second jack may be located at the front of the camper and the third jack and the fourth jack may be located at the rear of the camper.

Each wall of the camper may have an inner wall and an outer wall, the first jack being disposed between the inner and the outer wall of the first sidewall and the second jack being disposed between the inner wall and the outer wall of the second sidewall. However, an inner wall need not be part of the camper wall construction such that the jacks are completely or partially exposed to be visible from the interior of the camper. In other embodiments where an inner wall is provided, the inner wall may have a bulged area or unevenness to accommodate one or more of the jacks.

BRIEF DESCRIPTION OF THE SEVERAL VIEWS OF THE DRAWING(S)

FIG. 4 is a partitioned view of a jack of the camper of FIG. 1.

FIG. 5 is a top view of a jack of the camper of FIG. 1.

FIG. 9 is a view similar to FIG. 2, except it is top view.

FIG. 10 is a rear view of the jack and frame of another embodiment of the camper.

DETAILED DESCRIPTION OF THE INVENTION

Figure 1:
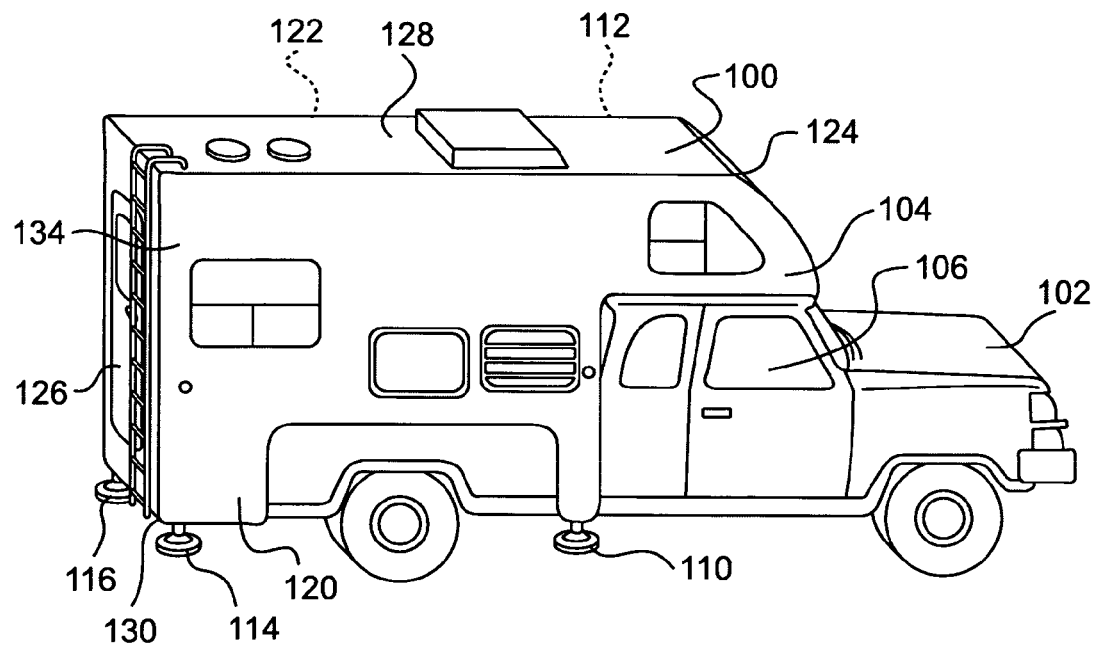
FIG. 1 is a perspective view of a pick-up truck camper according to the present invention.

Referring to FIG. 1, an embodiment of the pick-up truck camper 100 may be configured to mount onto a vehicle 102 such as, for example, a pick-up truck. The camper 100 may rest in the flat bed of the truck 102 and include an overhang 104 that extends over the cabin 106 of the truck 102. The camper 100 may include a first jack 110, a second jack 112, a third jack 114, and a fourth jack 116. The jacks 110, 112, 114, 116 may be used to raise the camper 100 off of the truck 102 so that the truck 102 may drive out from underneath the camper 100. The jacks 110, 112, 114, 116 may also be used to lower the camper 100 onto the truck 102, when the truck 102 is positioned below the camper 100. Once the camper 100 is properly mounted on the truck 102, the jacks 110, 112, 114, 116 may be retracted so that the truck 102 may maneuver with the camper 100 securely mounted on the truck 102, as shown in FIG. 1.

Figure 2:
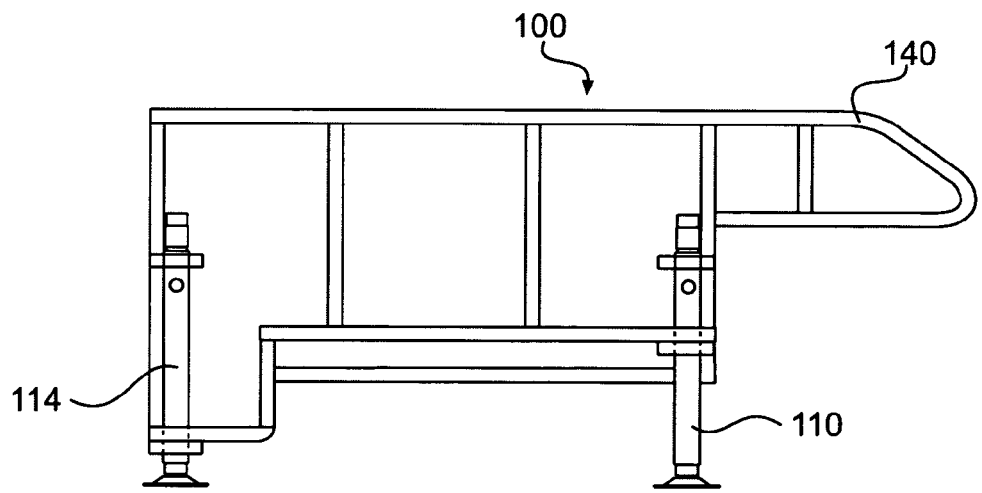
FIG. 2 is a side view of the frame and jacks of the camper of FIG. 1.
Figure 3:
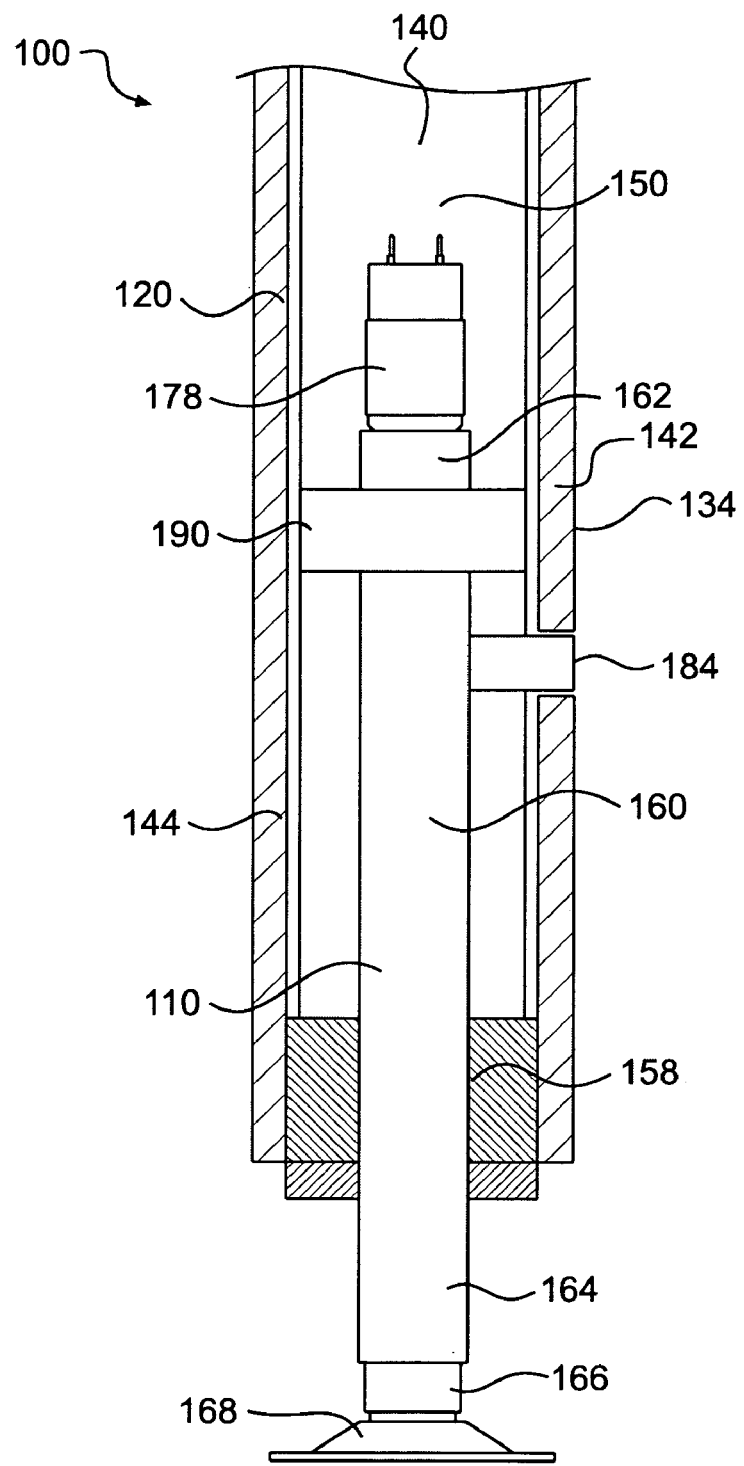
FIG. 3 is a cross-sectional view of a sidewall of the camper of FIG. 1.

Referring to FIG. 1, the pick-up truck camper 100 further comprises a first sidewall 120, a second sidewall 122, a front wall 124, and a rear wall 126 covering a frame. The camper 100 may also include a top wall 128 and a bottom wall 130. The walls 120, 122, 124, 126, 128, 130 define the exterior 134 of the camper 100. Referring to FIG. 2, the camper 100 includes a frame 140 to which the walls may be mounted. The frame 128 may be located inside the exterior of the camper 100. Referring to FIG. 3, the first sidewall 120 may have a double-walled construction and may be comprised of an outer wall 142, which constitutes the exterior 134 of the camper 100, and an inner wall 144. The outer wall 142 and the inner wall 144 may be substantially planar to each other. The frame, 140 may also be disposed between the outer wall 142 and the inner wall 142 of the first sidewall 120. The second sidewall, the front wall, the rear wall, the top wall, and the bottom wall may be similarly constructed as the first sidewall 120. Accordingly, the second sidewall, the front wall, the rear wall, the top wall, and the bottom wall may also all have a double wall construction including an inner wall and outer wall. The frame may be disposed between the inner walls and the outer walls of all the camper walls.

Referring to FIG. 1, the first jack 110 may be disposed inside the first sidewall 120. The second jack 112 may be disposed inside the second sidewall 122. The third jack 114 and the fourth jack 116 may be disposed inside the first and second sidewalls 120, 122, respectively. The sidewalls 120, 122 may be substantially planar such that the internal and external walls of the sidewalls 120, 122 do not bulge in order to accommodate the jacks 110, 112, 114, 116. In other embodiments, the internal walls of the sidewalls 120, 122 can include a bulged area or an unevenness to accommodate one or more of the jacks 110, 112, 114, 116. In embodiments where the sidewalls 120, 122 do not have a double-walled construction, the jacks 110, 112, 114, 116 can be completely or partially exposed such that they are visible from the interior of the camper.

Referring to FIG. 9, the first and second jacks 110, 112 may be disposed at the front 146 of the camper 100 and the third and fourth jacks 114, 116 may be disposed at the rear 148 of the camper 100. The frame 100 may include a first corner post 150, a second corner post 152, a third corner post 154, and a fourth corner post 156. The first, second, third, and fourth jacks 110, 112, 114, 116 may be mounted to the first, second, third, and fourth corner posts 150, 152, 154, 156, respectively.

The first, second, third, and fourth jacks may all be similarly configured and similarly mounted to the camper. Accordingly, only the first jack will be described in detail. Referring to FIG. 2, the first jack 110 may be mounted to the frame 140 at the first corner post 150. Referring to FIG. 3, the first corner post 150 and a first lower bar 158 of the frame 140 may be disposed between the inner wall 144 and the outer wall 142 of the first sidewall 120. The jack 110 will be hidden from view except for those portions extending below the first sidewall 120.

Referring to FIG. 3, the jack 110 may have a tubular body 160 with first and second distal ends 162, 164. The jack 110 may include an extendable shaft 166 disposed within the body 160 and extending out of the second distal end 164 of the body 160. A foot 168 may be located at a lower distal end 170 of the shaft 166. Referring to FIG. 4, the jack 110 may include drive mechanics 176 internal to the body 160. The internal mechanics 176 operate to extend and retract the extendable shaft 164 out of and into the body 160. The jack 110 may include an electric motor 178 mounted at the first distal end 162 of the body 160 wherein the electric motor 178 drives the mechanics 176. The mechanics 176 may include gearing such as, for example, planetary gears, that translate the rotary motion of the motor's drive shaft 180 into linear motion of the extendable shaft 164. The mechanics 176 of the jack 110 may also be driven manually by a crank shaft. The jack 110 includes a crank shaft port 184 for receiving the operating end of a crank shaft. Referring to FIG. 3, the crank shaft port 184 may extend through the outer wall 142 of the first sidewall 120 so that an operator may operate the jack 110 from outside the camper with a crank shaft. Referring to FIG. 4, the jack has a diameter 188 that is sufficiently small so that the jack 110 may be disposed within the first sidewall 120. The jack 110 may have a diameter 188 of 2.25 inches (6.67 cm). In another embodiment, the jack may have a diameter 188 of between 1.75 inches (4.45 cm) and 3.00 inches (7.62 cm).

Figure 7:
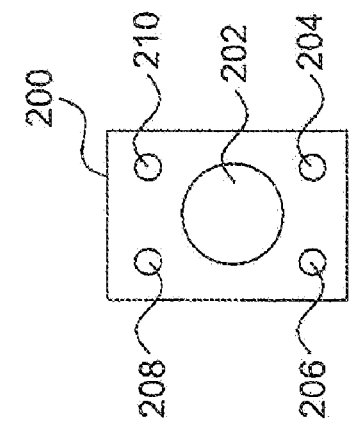
FIG. 7 is a top view of a mounting plate of the camper of FIG. 1.
Figure 6:
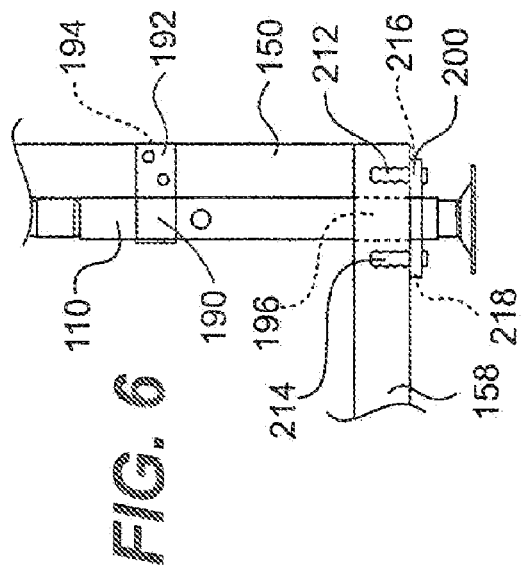
FIG. 6 is a partial view of FIG. 2.
Figure 8:
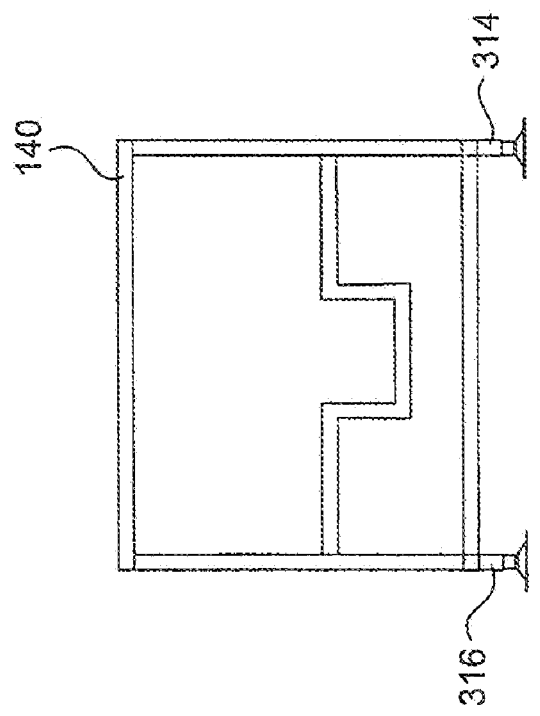
FIG. 8 is a view similar to FIG. 2, except it is a rear view.

Referring to FIG. 6, the first jack 110 may be attached to the corner post 150 by a strap 190 with a first end 192 and a second end 194. The strap 190 may wrap around the jack 110 while the first end 192 and the second end 194 may be bolted to the corner post 150, thereby securing the jack 110 to the corner post 150. The strap 190 may mount the first jack 110 to the corner post 150 by tightly surrounding the jack 110. The strap 190 may be a two inch wide band of 16 gauge steel. The first jack 110 may also be mounted to the frame 140 at a lower bar 158 of the frame 140. The lower bar 158 may have a hole 196 that passes therethrough. The jack 110 may pass through the hole 196 in the bar 158. The jack 110 may include a mounting plate 200 welded to the jack 110 below the lower bar 158. The mounting plate 200 may be bolted to the underside of the lower bar 158, thereby securing the jack 110 to the lower bar 158. Referring to FIG. 7, the mounting plate 200 may include a center hole 202 through which the jack passes. The mounting plate 200 may further include four bolt holes 202, 204, 206, and 208 that pass therethrough. Referring to FIG. 6, the bolt holes may receive bolts 212, 214, 216, 218 to secure the jack 110 to the underside of the lower bar 158.

Referring to FIG. 10, there is shown the frame 250 of another embodiment of the pick-up truck camper 252. The third jack 254 and the fourth jack 256 are disposed inside the rear wall such that they are aligned between the third corner post 260 and the fourth corner post 264.

Figure 11:
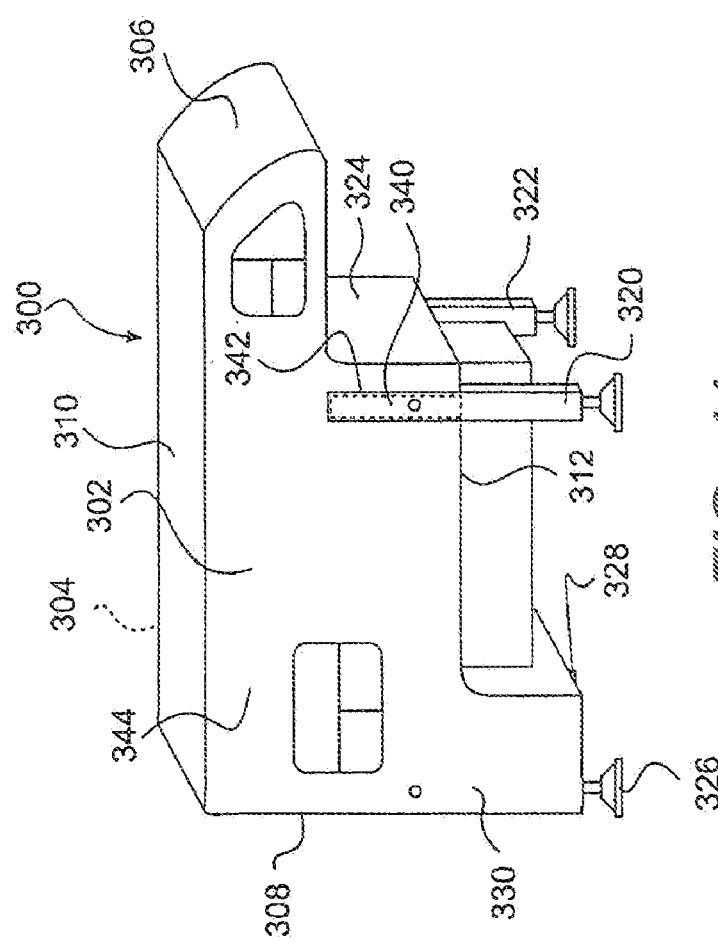
FIG. 11 is a perspective view of another embodiment of the camper.

Referring to FIG. 11, there is shown another embodiment of the pick-up truck camper 300. The camper 300 may comprise a first sidewall 302, a second sidewall 304, a front wall 306, a rear wall 308, a top wall 310, and a bottom wall 312, wherein the walls cover a frame. Each wall 302, 304, 306, 308, 310, 312 of the camper may have an inner wall and an outer wall. The camper may include a first jack 320 and a second jack 322 located at the front 324 of the camper 300. The camper 300 may further include a third jack 326 and a fourth jack 328 located at the rear 330 of the camper 300.

Figure 12:
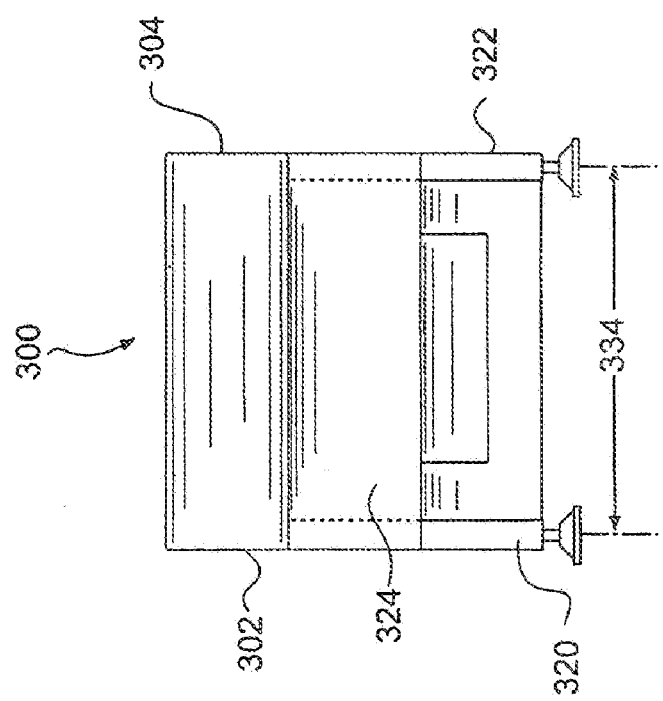
FIG. 12 is a front view of the camper of FIG. 11.
Figure 14:
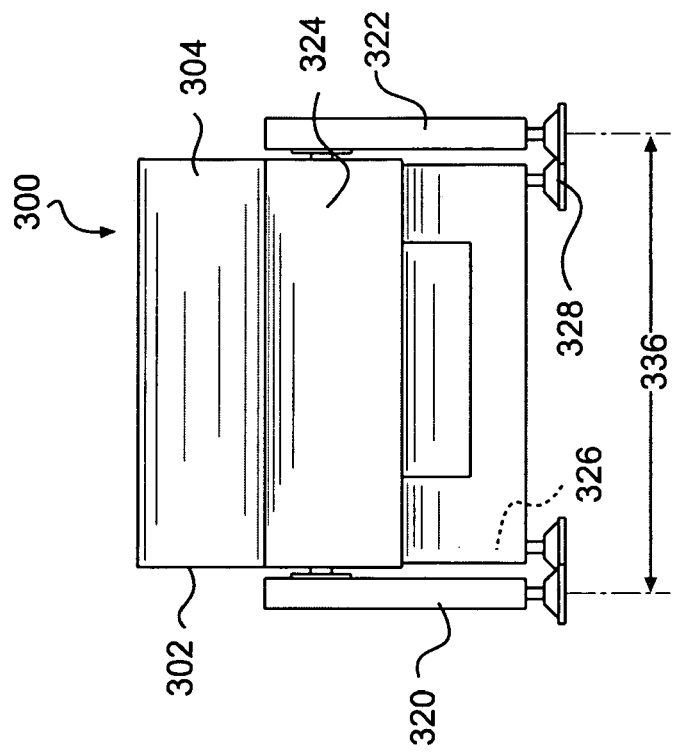
FIG. 14 is the same view as FIG. 12, but the front jacks have been extended.
Figure 13:
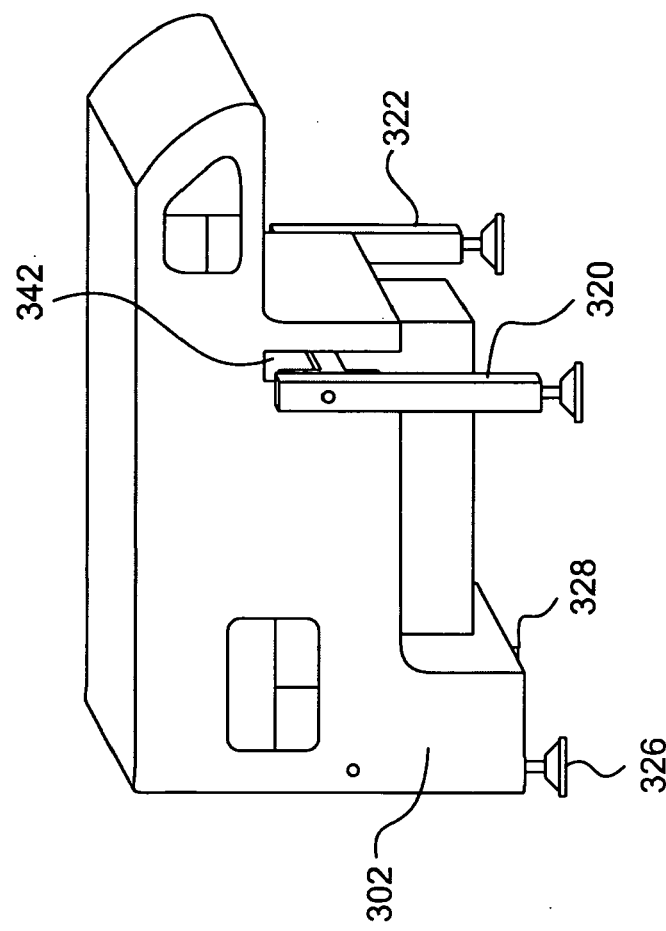
FIG. 13 is the same view as FIG. 11, but the front jacks have been extended.

Referring to FIG. 11, the first jack 320 may be a pull-out jack. The first jack 320 may be movable between a first position, shown in FIG. 11, in which the jack 320 is disposed inside the first sidewall 302 and a second position, shown in FIG. 13, in which the jack 320 extends out from the first sidewall 302. The second jack 322 may also be a pull-out jack movable between a first position, shown in FIG. 12, in which the jack is disposed inside the second sidewall 304 and a second position, shown in FIG. 14, in which the jack 322 extends out from the second sidewall 304. The first and second jacks 322, 324 may extend out in order to accommodate the rear end of a pick-up truck that may be wider than the distance 334 between the first and second jacks 320, 322 when the jacks 320, 322 are in their respective first positions. The first and second jacks 320, 322 may extend out to separate by a distance 336. Accordingly, the camper 300 may posses the advantageous qualities of a camper 300 with first and second jacks 320, 322 that are internal to the sidewalls 302, 304 of the camper 300, while being compatible to use with trucks of various widths, including those with large widths. Referring to FIGS. 12 and 14, the distance 336 between the first and second jacks 320, 322 may be at least eight inches greater when the jacks 320, 322 are both in their respective second positions than the distance 334 between the jacks 320, 322 when the jacks 320, 322 are in their respective first positions. In other embodiments, the distance 336 between the first and second jacks 320, 322 may be at least twelve inches greater when the jacks 320, 322 are both in their respective second positions than the distance 334 between the jacks 320, 322 when the jacks 320, 322 are in their respective first positions.

Figure 15:
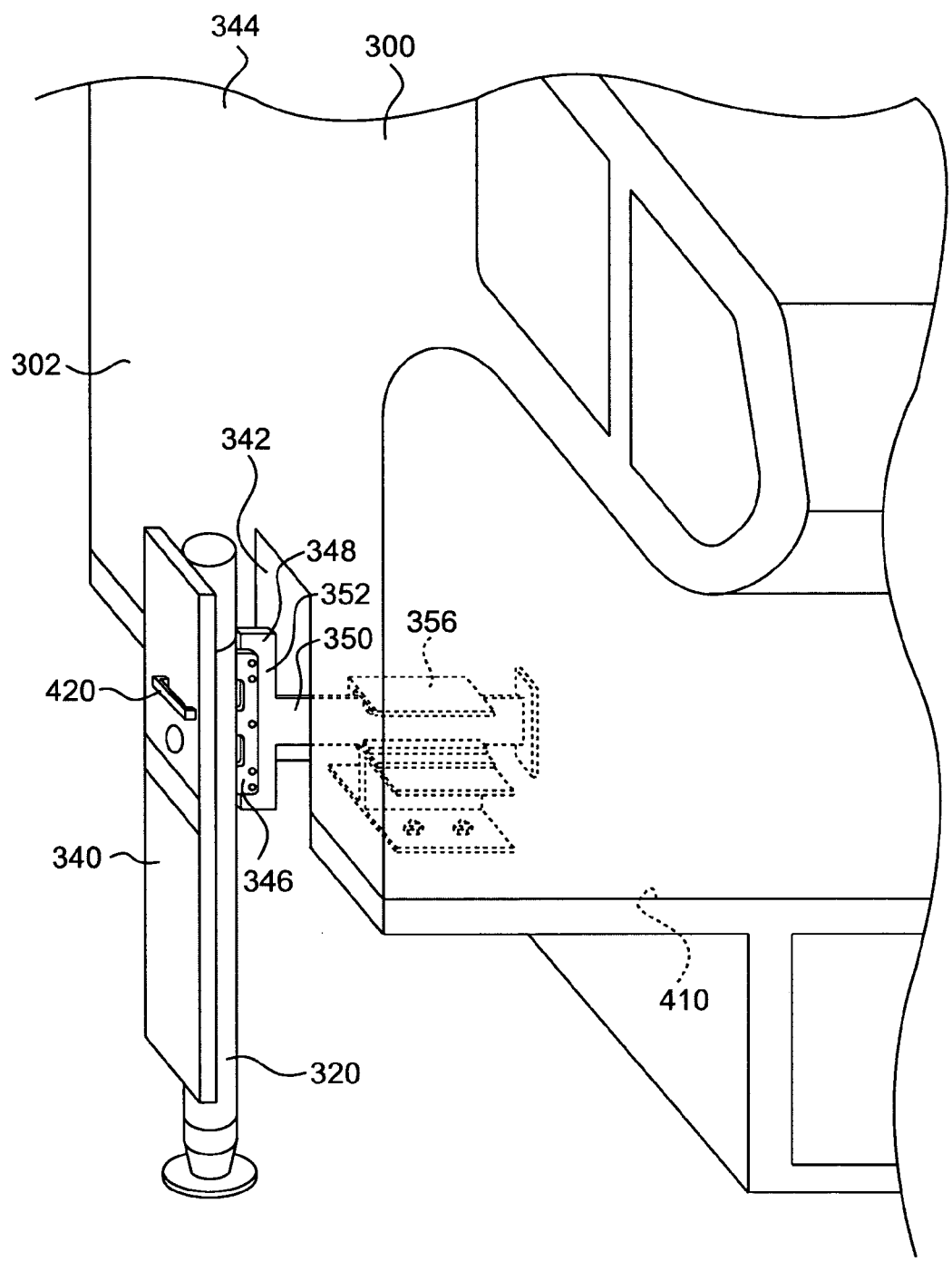
FIG. 15 is a partial perspective view of the camper of FIG. 11.

The first jack and the second jack may be similarly configured and similarly mounted to the pick-up truck camper. Accordingly, only the first jack will be described in detail. Referring to FIG. 15, the first jack 320 may be similarly configured to the first jack 110 of FIG. 3, but the jack 320 may include a different mounting and additional components. The jack 320 may include a wall 340 portion on the outer side of the jack 320. The first sidewall 302 of the camper 300 may include a recess 342 which is configured to receive the first jack 320 when the jack 320 is in the first position. The wall portion 340 may be consistent with the outer wall 344 of the first sidewall 302 such that when the jack 320 is in the first position inside the recess 342, the wall portion 340 will be flush with and blend in with the first sidewall 302 of the camper 300, as shown in FIG. 11.

Figure 16:
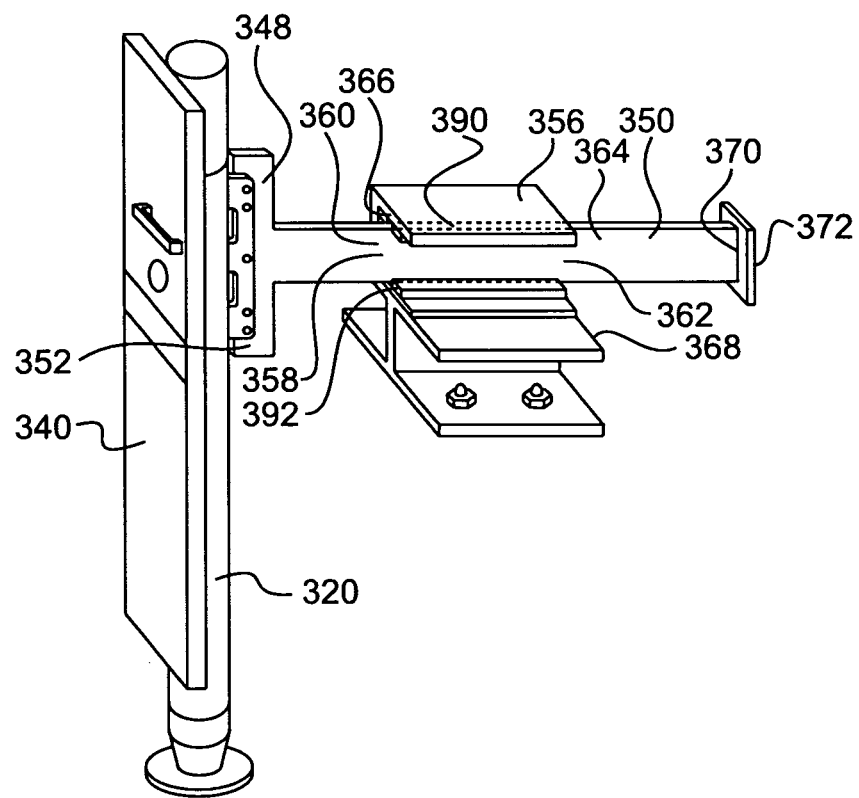
FIG. 16 is a perspective view of a jack and a mounting of the camper of FIG. 11.

Referring to FIG. 15, the first jack 320 may also include a flange 346 disposed on the inner side of the jack 320. The flange 346 may be attached to the first distal end 348 of an extension arm 350. The first distal end 348 of the extension arm 350 may comprise a vertical bar 352 to which the flange 346 may be bolted. The extension arm 350 may be slidably engaged with a channeled member 356, the channeled member 356 being disposed proximate the recess 342 within the camper 300. Referring to FIG. 16, the channeled member 356 may generally be a walled housing including a passageway 358, the passageway extending from a first opening 360 to a second opening 362. The body portion 364 of the extension arm 350 may pass through the passageway 358 such that the first distal end 348 of the extension arm 350 is located on a first side 366 of the channeled member 356 and a second distal end 370 of the extension arm 350 is located on a second side 368 of the channeled member 356. The second distal end 370 of the extension arm 350 may include a plate 372. The vertical bar 352 and the plate 372 of the extension arm 350 may each be larger than the first and second openings 360, 362, respectively, in at least one dimension. Accordingly, the vertical bar 352 and extension plate 370 may be physically prevented from entering the channeled member 356, thereby retaining the extension bar 350 in the passageway 358.

Figure 20:
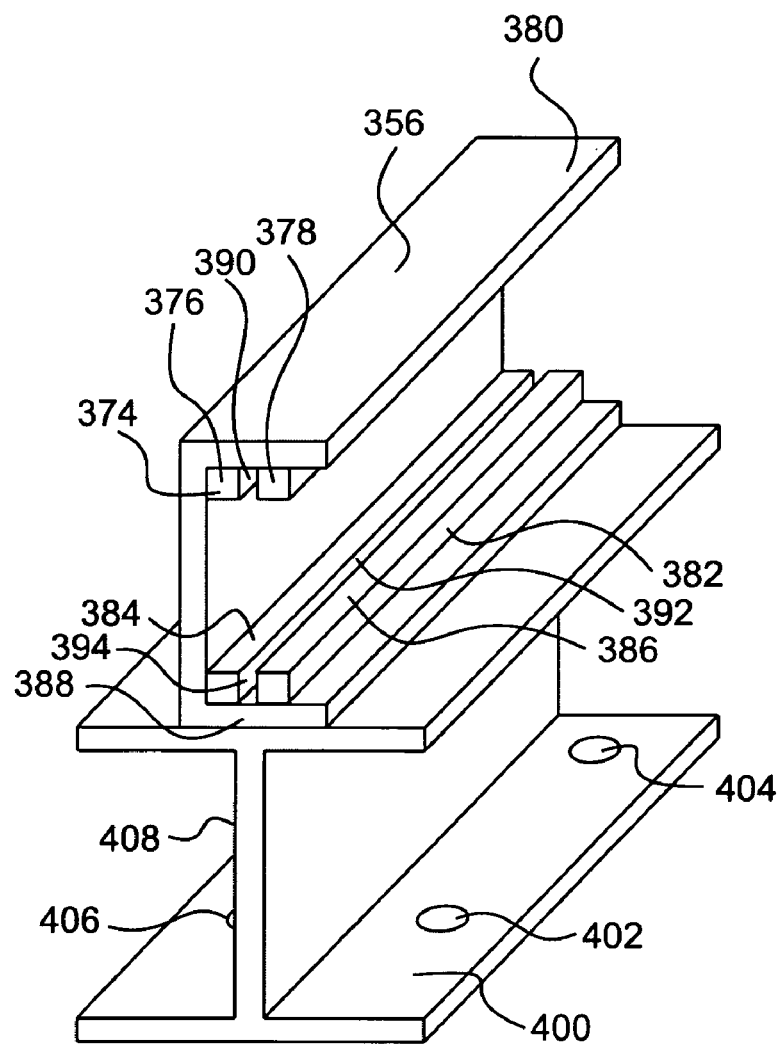
FIG. 20 is a perspective view of a mounting of the camper of FIG. 11.
Figure 22:
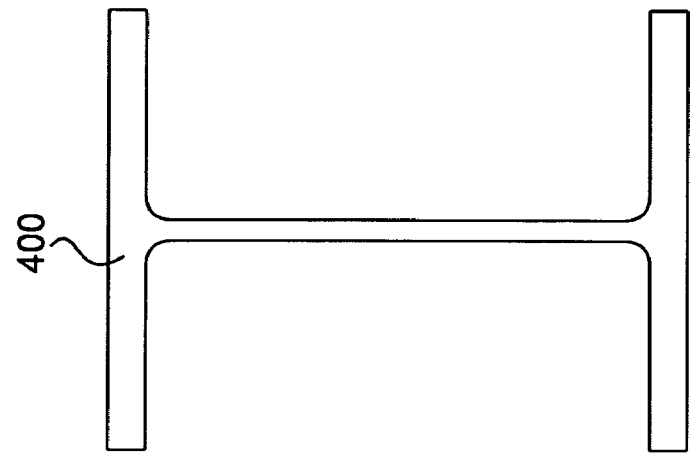
FIG. 22 is a side view of an I-beam of the camper of FIG. 11.
Figure 21:
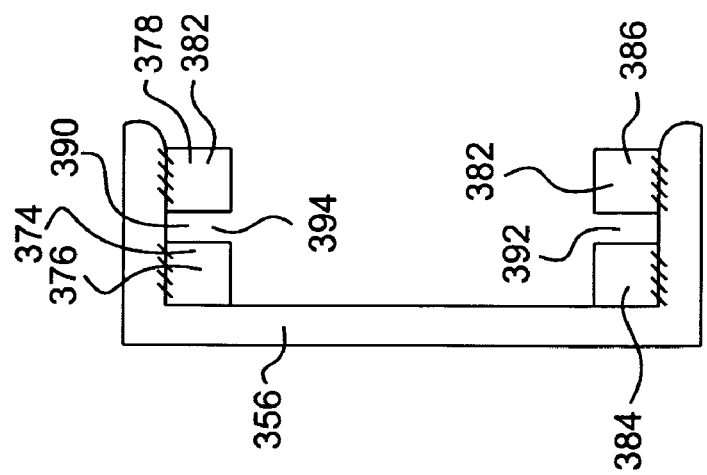
FIG. 21 is a side view of a channeled member of the camper of FIG. 11.
Figure 24:
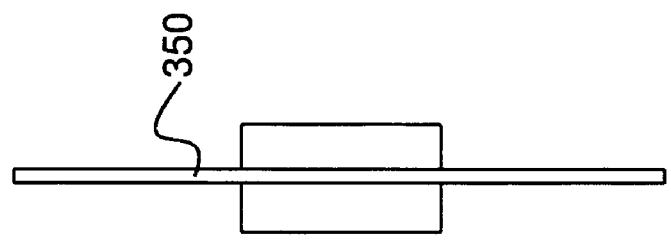
FIG. 24 is a side view of an extension arm of the camper of FIG. 11.
Figure 23:
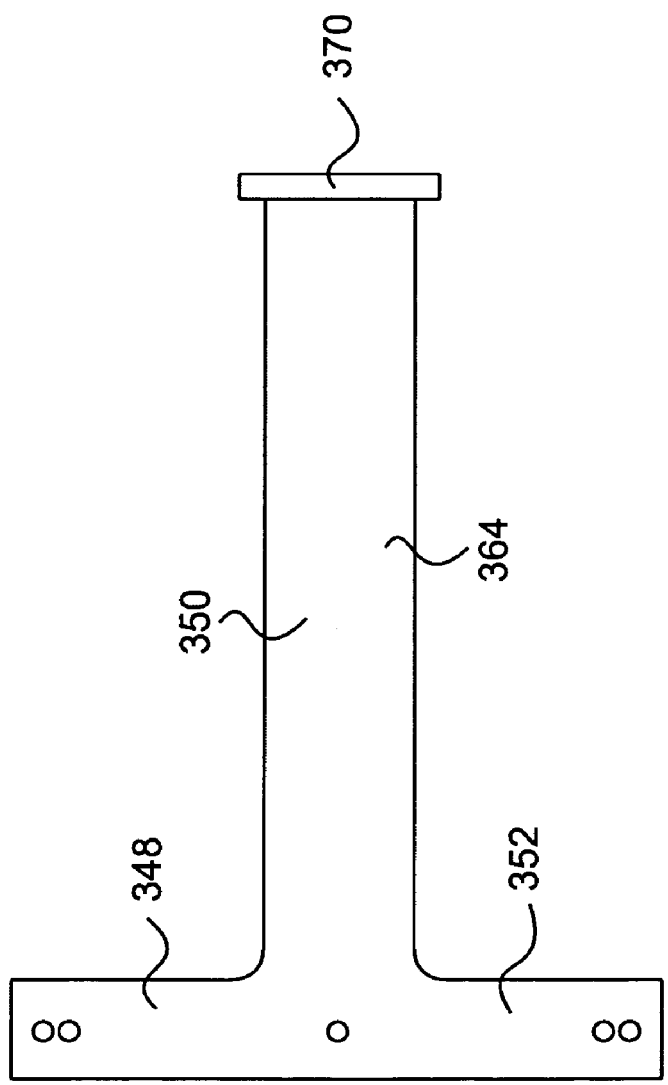
FIG. 23 is a front view of an extension arm of the camper of FIG. 11.

Referring to FIG. 20, the channeled member 356 may include a first pair 374 of ribs 376, 378 on an upper wall 380 and a second pair 382 of ribs 384, 386 on a lower wall 388. There is a first gap 390 between the first pair 374 of ribs and a second gap 392 between the second pair 382 of ribs. The first and second gaps 390, 392 may align to form a channel 394 for receiving the extension arm 350, as shown in FIG. 16. Referring to FIG. 20, the channeled member 356 may be mounted on an I-beam member 400. The I-beam member 400 may include a plurality of bolt holes 402, 404, 406, 408 to receive bolts. Referring to FIG. 15, the bolts may bolt the I-beam to an internal surface 410 of the camper.

Figure 18:
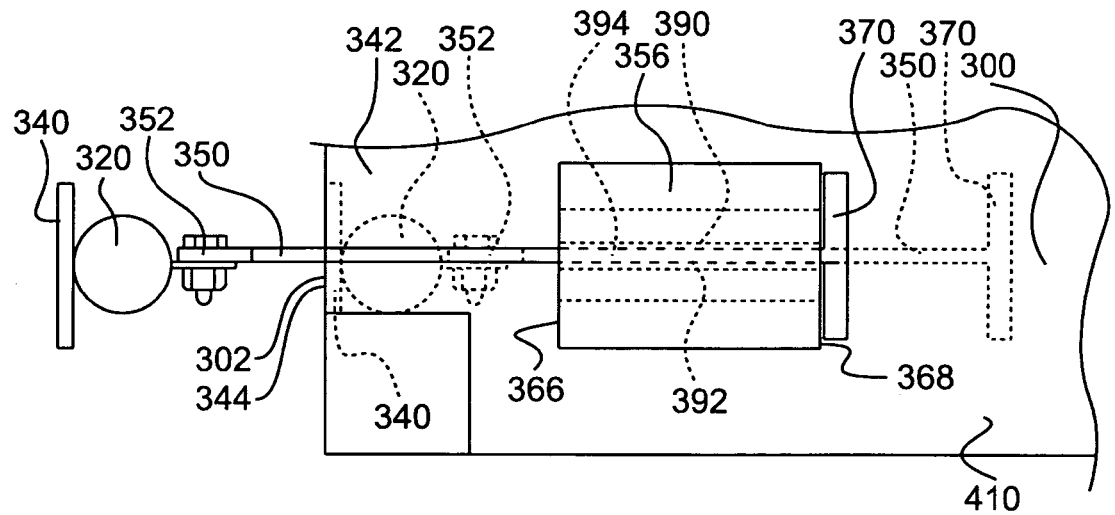
FIG. 18 is a top view of a jack and a mounting of the camper of FIG. 11.

Referring to FIG. 18, the extension arm 350 may be slidably disposed within the channel 394 of the channeled member 356. Accordingly, the jack 320 may travel between the first position and the second channel depending upon where the extension 350 is along its path of travel within the channeled member 356. When the vertical bar 352 is disposed against the first side 366 of the channeled member 356, as shown by the dotted lines in FIG. 18, the jack 320 may be within its first position wherein the wall portion 340 is aligned with the exterior 344 of the camper 320. When the plate 370 of the extension arm 350 is disposed against the second side 368 of the channeled member 356, as shown by the solid lines of FIG. 18, the jack 320 may be in the second position with the jack 320 fully extended out from camper 300. The extension arm 350 may travel within the channeled member 356 to position the jack 320 to any point between the first and second position.

Figure 19:
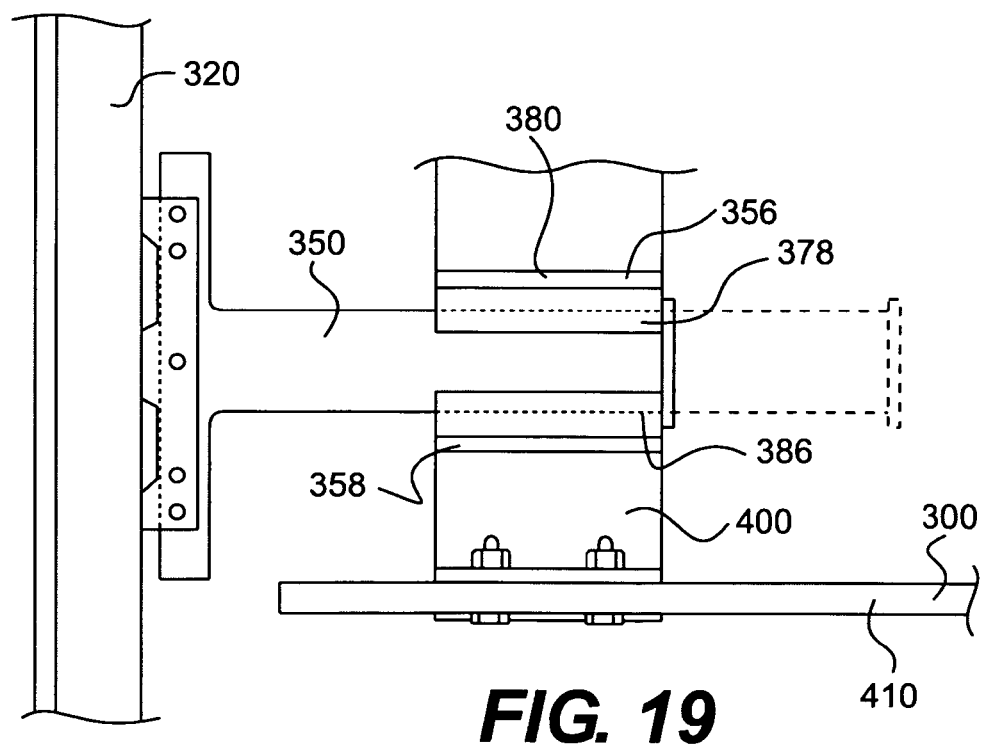
FIG. 19 is a front view of a jack and a mounting of the camper of FIG. 11.

Referring to FIG. 15, the wall portion 340 of the jack 320 may include a handle 420. An operator may use the handle 420 to move the jack 320 between the first position and the second position. This is possible because the channel 394 of the channeled member 356 is configured to permit the sliding of the extension arm 350 relative to the channeled member. The channeled member may be configured such that there is minimal friction between the extension arm 350 and the channel 394. Referring to FIGS. 18 and 19, the channel 394 may be narrow enough to ensure that the extension arm 350 travels a straight path relative to the channel 394, wherein the roll, yaw, and pitch is restricted by the fit of the extension arm 350 within the channel 394. The path of travel of the extension arm 350 may also be substantially perpendicular to the outer wall 320 of the camper 300. Accordingly, the jack 320 will consistently leave from and return to the recess 342 as it is moved between the first and second positions. In other embodiments the jack may be moved between the first position and the second position by other means such as, for example, hydraulics or an electrical motor.

Figure 17:
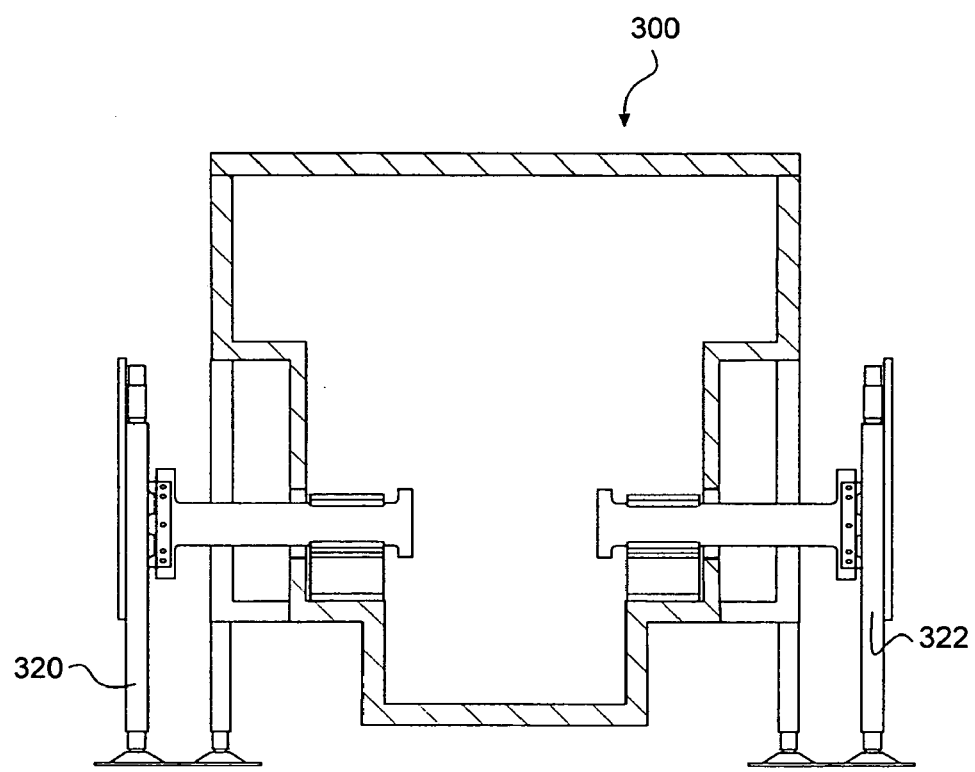
FIG. 17 is cross-sectional view of the camper of FIG. 11.

Referring to FIG. 17, the second jack 322 may be mounted to the camper in a mirror image of the first jack 320. Accordingly, the jacks 320, 322 may be moved towards and away from each other in order to manipulate the distance between the first and second jacks 320, 322. The first jack 320 and the second jack 322 may be mounted independently from one another so that the positionings of the first jack 320 and second jack 322 are independent of each other. In other embodiments, the first and second jacks may be mounted to the camper by a common mounting system. In one embodiment, the positioning of the first and second jacks may be correlated. In another embodiment, the first and second jacks can be mounted on a pivot to swing out away from the camper side to increase the distance between the jacks to define a wider pickup truck entry.

It will be appreciated that embodiments of the jacks and their respective mountings described herein are merely exemplary embodiments that are compatible with the described campers. The desired features and functions of the above described campers may be realized by various other embodiments that employ different jack features, fastening means, mounting assemblies, motion control systems, or mechanical, electrical, and hydraulic systems and components.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A wheel-less pick-up truck camper comprising:
   a frame;
   a first sidewall, a second sidewall, a front wall, and a rear wall covering the frame, the walls defining the exterior of the camper;
   a jack mounted to the camper and disposed inside the first sidewall, the jack adapted to raise and lower the camper relative to the surface upon which the jack rests such that the camper is respectively lifted off of and lowered onto a truck bed.

2. The camper of claim 1 further comprising a second jack, the second jack being disposed inside the second sidewall.

3. The camper of claim 1 wherein the sidewalls are substantially planar.

4. The camper of claim 2 wherein each wall has an inner wall and an outer wall, the first jack being disposed between the inner and outer wall of the first sidewall, the second jack being disposed between the inner wall and outer wall of the second sidewall.

5. The camper of claim 4 wherein the inner walls and the outer walls are substantially planar such that they do not bulge to accommodate the jacks.

6. The camper of claim 2 wherein the camper further comprises a third jack and a fourth jack.

7. The camper of claim 6 wherein the third and fourth jacks are mounted to the frame.

8. The camper of claim 2 wherein the first and second jacks are mounted to the frame.

9. The camper of claim 6 wherein the camper further comprises a front and a rear, the first and second jacks being disposed at the front of the camper and the third and fourth jacks being disposed at the rear of the camper.

10. The camper of claim 6 wherein the third jack is disposed between the inner wall and the outer wall of the first sidewall and the fourth jack is disposed between the inner wall and the outer wall of the second sidewall.

11. The camper of claim 6 wherein the third jack and the fourth jack are disposed between the inner wall and the outer wall of the rear wall.

12. The camper of claim 1 wherein the first jack has a diameter less than or equal to 2.25 inches.

13. The camper of claim 1 wherein the first jack includes a gear motor.

14. The camper of claim 1 wherein the first jack includes a planetary gear.

15. The camper of claim 1 wherein the first jack includes a manual crank port.

16. The camper of claim 15 wherein the first sidewall includes a first crank opening.

* * * * *